United States Patent
Wang et al.

(10) Patent No.: US 9,281,772 B2
(45) Date of Patent: Mar. 8, 2016

(54) CONTROLLER FOR POWER CONVERTER

(71) Applicants: TOSHIBA MITSUBISHI-ELECTRIC INDUSTRIAL SYSTEMS CORPORATION, Tokyo (JP); Wisconsin Alumni Research Foundation, Madison, WI (US)

(72) Inventors: Yukai Wang, Madison, WI (US); Takumi Ito, Tokyo (JP); Robert D. Lorenz, Madison, WI (US)

(73) Assignees: Toshiba Mitsubishi-Electric Industrial Systems Corporation, Tokyo (JP); Wisconsin Alumni Research Foundation, Madison, WI (US)

( * ) Notice: Subject to any disclaimer, the term of this patent is extended or adjusted under 35 U.S.C. 154(b) by 63 days.

(21) Appl. No.: 14/316,243

(22) Filed: Jun. 26, 2014

(65) Prior Publication Data
US 2015/0381092 A1   Dec. 31, 2015

(51) Int. Cl.
*H02P 21/00* (2006.01)
*G05F 3/06* (2006.01)
*H02P 21/14* (2006.01)
*H02P 9/00* (2006.01)

(52) U.S. Cl.
CPC ............... *H02P 21/141* (2013.01); *H02P 9/00* (2013.01); *H02P 21/0035* (2013.01)

(58) Field of Classification Search
CPC ... H02P 21/141; H02P 21/0035; H02P 2/146; H02P 9/00; H02P 21/003
USPC .............. 318/400.02, 400.01; 307/151; 363/1–12, 150
See application file for complete search history.

(56) References Cited

U.S. PATENT DOCUMENTS 8,829,828 B2 *   9/2014   Godridge .................. H02P 9/00
                                                          318/400.02

OTHER PUBLICATIONS

Hinkkanen et al.; "Braking Scheme for Vector-Controlled Induction Motor Drives Equipped With Diode Rectifier Without Braking Resistor", IEEE Transactions on Industry Applications, vol. 42, No. 5, pp. 1257-1263. (2006).
Rastogi et al.: "Dual-Frequency Braking in AC Drives". IEEE Transactions on Power Electronics, vol. 17, No. 6, 1032-1040, (2002).
Jiang et al.; "An Efficient Braking Method for Controlled AC Drives With a Diode Rectifier Front End", IEEE Transactions on Industry Applications, vol. 37. No. 5, pp. 1299-1307, (2001).
Lascu et al.; "A Modified Direct Torque Control for Induction Motor Sensorless Drive", IEEE Transactions on Industry Applications, vol. 36 No. 1, pp. 122-130, (2000).

* cited by examiner

*Primary Examiner* — Bentsu Ro
*Assistant Examiner* — Zemenay Truneh
(74) *Attorney, Agent, or Firm* — Finnegan, Henderson, Farabow, Garrett & Dunner, LLP (57) ABSTRACT

A controller for a power converter detects a current output from the power converter, estimates a flux vector of the motor, and calculates a torque line in a physical model resulting from mathematizing a circuit equivalent to the motor, based on the estimated flux vector. The torque line indicates a line for obtaining a desired torque in a subsequent control period. The controller calculates a stator flux command value in accordance with a loss, calculates a voltage command value based on the torque line and the stator flux command value, and controls an output voltage.

12 Claims, 5 Drawing Sheets

CONTROLLER FOR POWER CONVERTER

BACKGROUND OF THE INVENTION

1. Field of the Invention

An embodiment described herein relates generally to a controller for a power converter that drives a motor.

2. Description of the Related Art

In general, a regeneration brake is known as means for decelerating a motor. When the regeneration brake is used, it must consume the regeneration energy generated by the motor. As a method of consuming the regeneration energy, there is a method of, for example, providing a resistance on the DC-side of an inverter for consuming the energy. In this case, it is necessary to add a resistor as new hardware. There is another method, in which the energy is returned to the power supply side. In this method, a converter for supplying DC power to the inverter that drives the motor is required to perform inversion, and hence it is necessary to replace a diode rectifier with an expensive converter than that. In light of these requirements, such methods as below utilizing control by an inverter have been proposed.

A first method is a method of strengthening, utilizing indirect field oriented control (IFOC), a magnetic flux within a range in which the DC capacitor voltage does not exceed the upper limit, thereby causing a motor to consume energy (Marko Hinkkanen, et al., "Braking Scheme for Vector-Controlled Induction Motor Drives Equipped With Diode Rectifier Without Braking Resistor," IEEE TRANSACTIONS ON INDUSTRY APPLICATIONS, IEEE, September/October 2006, VOL. 42, No. 5, pp. 1257-1263).

A second method is a method of superimposing different frequencies, and is also a braking method utilizing the above-mentioned IFOC. In this method, a relatively low-order frequency current is superimposed on an output current to cause a motor to consume energy (Mukul Rastogi, et al., "Dual-Frequency Braking in AC Drives," IEEE TRANSACTIONS ON POWER ELECTRONICS, IEEE, 2002, November, VOL. 17, No. 6, pp. 1032-1040).

A third method is a high-frequency wave superimposing method, and is also a braking method utilizing the above-mentioned IFOC. In this method, a current containing a large number of high-frequency components is superimposed on an output current to thereby cause a motor to consume energy (Jinsheng Jiang, et al., "An Efficient Braking Method for Controlled AC Drives With a Diode Rectifier Front End," IEEE TRANSACTIONS ON INDUSTRY APPLICATIONS, IEEE, 2001, September/October, VOL. 37, No. 5, pp. 1299-1307).

IFOC is a motor control method known as general vector control. However, the above-mentioned methods principally have the following problems. Since IFOC is a method of controlling current to indirectly control flux, and the first-order lag transfer function determined from a motor constant exists between the current and the flux. Accordingly, a motor response beyond the first order lag cannot be expected. Further, in the second and third methods, frequencies other than the inverter output frequency are superimposed, which principally causes torque ripple.

In contrast to the above three methods, there is a direct torque control method (fourth method). The fourth method is a method of directly controlling torque and flux to increase the magnitude of the stator flux with a fast response so as to make a motor consume energy. In this control, since the flux can be directly controlled, there is no influence of the first order lag. Therefore, the fourth method exhibits a high response compared to IFOC. In the fourth method, however, in order to determine a switching pattern on the inverter for driving the motor, hysteresis must be provided for the torque and flux control, which principally causes torque ripple (Cristian Lascu, et al., "A Modified Direct Torque Control for Induction, Motor Sensorless Drive," IEEE TRANSACTIONS ON INDUSTRY APPLICATIONS, IEEE, January/February 2000, VOL. 36, No. 1, pp. 122-130).

BRIEF SUMMARY OF THE INVENTION

It is an object of the invention to provide a controller for a power converter, the controller capable of putting, on a motor, a brake of good response with no torque ripple.

In accordance with an aspect of embodiments, there is provided a controller for a power converter configured to drive a motor. The controller comprises a current detector configured to detect a current output from the power converter; a flux vector estimation module configured to estimate a flux vector of the motor based on the current detected by the current detector; a torque line calculation module configured to calculate a torque line in a physical model resulting from mathemating a circuit equivalent to the motor based on the flux vector estimated by the flux vector estimation module, the torque line indicating a line for obtaining a desired torque in a subsequent control period; a stator flux command value calculation module configured to calculate a stator flux command value in accordance with a loss; a voltage command value calculation module configured to calculate a voltage command value based on the torque line calculated by the torque line calculation module and the stator flux command value calculated by the stator flux command value calculation module; and an output voltage controller configured to control an output voltage of the power converter based on the voltage command value calculated by the voltage command value calculation module.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
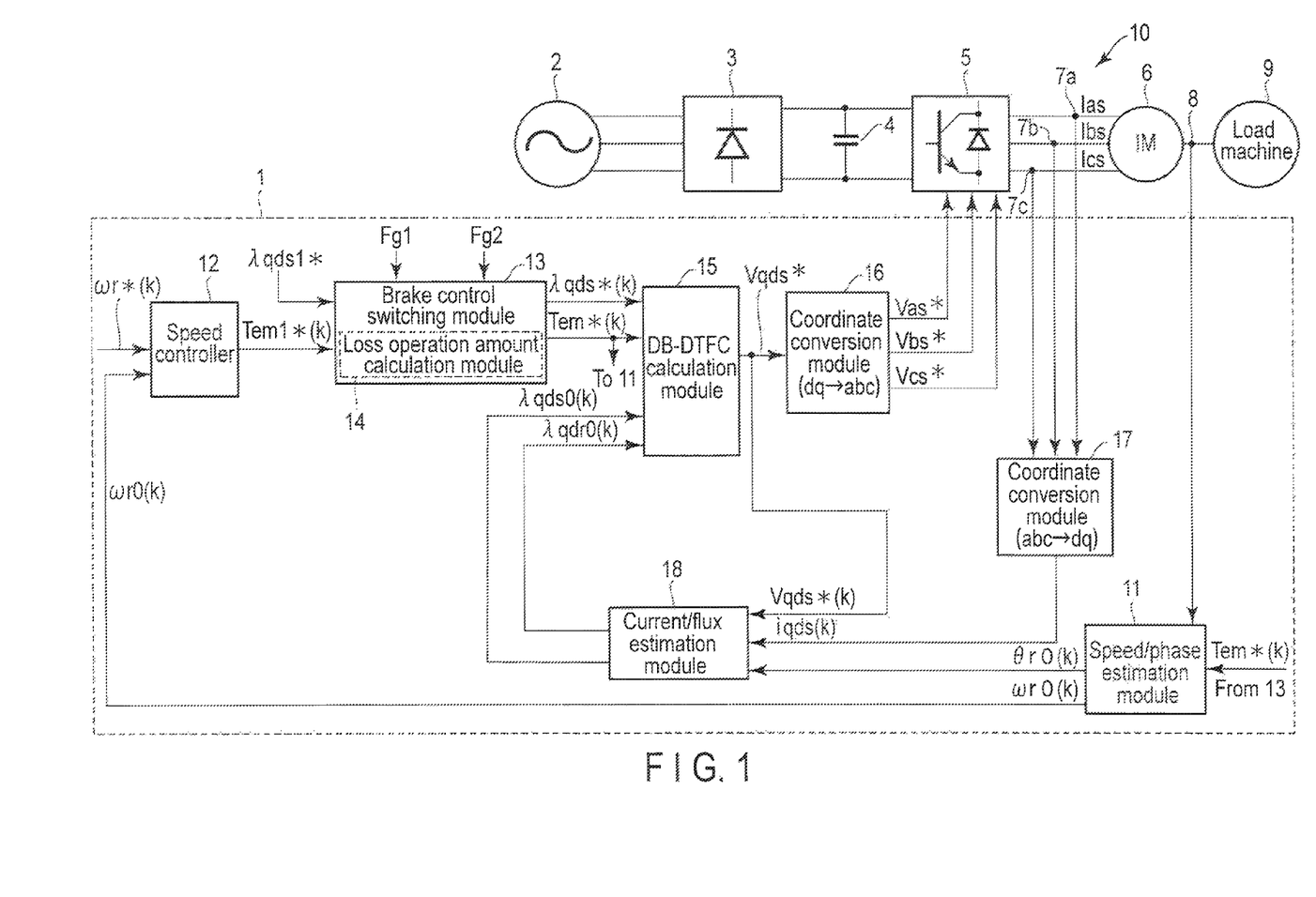
FIG. 1 is a block diagram showing the configuration of a motor drive system according to an embodiment.

FIG. 1 is a block diagram showing the configuration of a motor drive system 10 according to an embodiment. In the accompanying drawings, like reference numbers denote like elements, and different elements will be mainly described in detail.

The motor drive system 10 includes a controller 1, an AC power supply 2, a diode rectifier 3, a capacitor 4, an inverter 5, an induction motor 6, current detectors 7a, 7b and 7c of three phases, and a phase sensor 8. The motor drive system 10 operates a load machine 9 using the induction motor 6 as a mechanical power source.

The AC power supply 2 supplies three-phase AC power to the diode rectifier 3. For instance, the AC power supply 2 is a grid.

The diode rectifier 3 converts, into DC power, the three-phase AC power supplied from the AC power supply 2. The power supply is not limited to the diode rectifier 3, but may be any other power supply, if it supplies a DC power to the inverter 5. However, power is not regenerated to the AC power supply 2, and hence the power supply may be a regeneration-disabled one.

The capacitor 4 is provided across a DC link that connects the diode rectifier 3 to the inverter 5. The capacitor 4 is used to smooth the DC voltage (DC link voltage) applied to the DC link.

The inverter 5 converts the DC power supplied from the diode rectifier 3 into three-phase AC power for driving the induction motor 6. The inverter 5 is a voltage source inverter. The inverter 5 is subjected to variable voltage variable frequency (VVVF) control performed by the controller 1 through pulse width modulation (PWM) control. The power conversion circuit of the inverter 5 is formed of three arms. One of the arms includes an upper arm and a lower arm. The upper and lower arm are each formed of at least one switching element.

The induction motor 6 is driven by the three-phase AC power output from the inverter 5.

The current detectors 7a, 7b and 7c of three phases are provided at the respective phases of the output side of the inverter 5. The current detectors 7a, 7b and 7c detect the stator currents Ias, Ibs, Ics of the three phases, respectively. The current detectors 7a, 7b and 7c output the detected three-phase stator currents Ias, Ibs, Ics to the controller 1. The stator currents Ias, Ibs, Ics are those output from the inverter 5 and input to the stators of the induction motor 6. Further, it should be noted that if currents of the two phases are detected, the remaining one-phase current can be calculated. Accordingly, two current detectors may be provided for the two phases.

The phase sensor 8 detects the signal output in accordance with the rotation of the rotor of the induction motor 6 in order to estimate the rotor angle (electric angle) $\theta r(k)$ of the induction motor 6. The phase sensor 8 outputs the detected signal to the controller 1. 'k' in brackets is a natural number and represents the k-th step of control sampling. It is assumed that the symbol 'k' in brackets described later also represents the k-th step of control sampling.

The load machine 9 is an inertia load connected to the induction motor 6. The load machine 9 is driven by the induction motor 6. The load machine 9 is, for example, a fan or blower.

The controller 1 controls the output power of the induction motor 6 based on the phase currents Ias, Ibs, Ics and the detection signals detected by the phase sensor 8. Thus, the driving operation of the induction motor 6 is controlled. The controller 1 employs, as a control method, a dead-beat direct torque & flux control (DB-DTFC) method.

DB-DTFC is a scheme in which control is performed to make the torque and flux of the induction motor 6 directly reach target values in every control period (every sampling period). Further, deadbeat control means a method of performing sequential control to enable the target value derived from the physical model of the induction motor 6 to be reached in every control period. The controller 1 performs control to maximize the loss so as to make regeneration energy be consumed during braking. When the loss model is used, control can be performed to minimize loss during power running.

Further, DB-DTFC is a type of vector control. The complex vector used for this control is a vector represented by an orthogonal coordinate system wherein a d axis is orthogonal to a q axis. The d axis is an imaginary axis, and the q axis is a real axis.

The controller 1 includes a speed/phase estimation module (observer) 11, a speed controller 12, a brake control switching module 13, a loss operation amount calculation module 14, a DB-DTFC calculation module 15, two coordinate conversion modules 16 and 17 and a current/flux estimation module (observer) 18.

The speed/phase estimation module 11 receives a detection signal from the phase sensor 8, and a calculated torque command value Tem*(k) from the brake control switching module 13. The torque command value Tem*(k) is an command value for air-gap torque. The speed/phase estimation module 11 calculates a rotor angle estimate value $\theta r0(k)$ and a rotor angular velocity estimate value (speed feedback value) $\omega r0(k)$, based on the detection signal from the phase sensor 8 and the torque command value Tem*(k). The speed/phase estimation module 11 outputs the calculated rotor angle estimate value $\theta r0(k)$ to the current/flux estimation module 18, and outputs the calculated rotor angular velocity estimate value $\omega r0(k)$ to the speed controller 12.

The speed controller 12 receives a rotor angular velocity command value $\omega r*(k)$, and also receives the calculated rotor angular velocity estimate value $\omega r0(k)$ from the speed/phase estimation module 11. The speed controller 12 calculates the torque command value Tem1*(k) to follow the rotor angular velocity command value $\omega r*(k)$. For instance, the speed controller 12 performs proportional-plus-integral (PI) control. The speed controller 12 outputs the calculated torque command value Tem1*(k) to the brake control switching module 13.

The brake control switching module 13 receives the calculated torque command value Tem1*(k) from the speed controller 12, and receives a preset stator dq-axes flux command value $\lambda qds1*$, a brake preparation flag Fg1 and a brake start flag Fg2. Based on the brake preparation flag Fg1 and the brake start flag Fg2, the brake control switching module 13 switches the torque command value Tem*(k) and the stator dq-axes flux command value $\lambda qds*(k)$ to the values used during a normal operation and a braking operation, respectively. The brake control switching module 13 outputs the torque command value Tem*(k) to the speed/phase estimation module 11 and the DB-DTFC calculation module 15, and outputs the stator dq-axes flux command value λqds*(k) to the DB-DTFC calculation module 15. The stator dq-axes flux command value λqds*(k) output from the brake control switching module 13 is a scalar amount.

During a normal operation, the brake control switching module 13 outputs the torque command value Tem*1(k), output from the speed controller 12, as a finally determined torque command value Tem*(k), and outputs a preset stator dq-axes flux command value λqds1* as the stator dq-axes flux command value λqds*(k). It should be noted that the stator dq-axes flux command value λqds*(k) used during the normal operation can be set to a desired value.

When braking is started, the controller 1 sets the brake preparation flag Fg1 to change the stator dq-axes flux command value λqds*(k) to maximize loss. When the stator dq-axes flux has reached the value that causes maximum loss, the controller 1 sets the brake start flag Fg2, switches control from speed control to torque control, and performs braking under torque control with the maximum torque command value Tem*(k) at which voltage increase in the DC link (capacitor 4) falls within an allowable range. The torque command value Tem*(k) and the stator dq-axes flux command value λqds*(k), at which maximum loss is obtained, are expressed by functions of speed. These speed functions are preset in the loss operation amount calculation module 14 contained in the brake control switching module 13. During braking, the loss operation amount calculation module 14 changes the torque command value Tem*(k) and the stator dq-axes flux command value λqds*(k) in accordance with the speed of the motor, using the speed functions.

The DB-DTFC calculation module 15 receives a calculated stator dq-axes flux estimate value λqds0(k) and a calculated rotor dq-axes flux estimate value λqdr0(k) from the current/flux estimation module 18, and the torque command value Tem*(k) and the stator dq-axes flux command value λqds*(k) from the brake control switching module 13. The physical model of the induction motor 6 is preset in the DB-DTFC calculation module 15. The physical model is obtained by replacing the induction motor 6 with an equivalent circuit and mathematizing the circuit.

Using the physical model, the DB-DTFC calculation module 15 performs calculation for executing DB-DTFC, based on the torque command value Tem*(k), the stator dq-axes flux command value λqds*(k), the stator dq-axes flux estimate value λqds0(k) and the rotor dq-axes flux estimate value λqdr0(k). The DB-DTFC calculation module 15 calculates a torque line Te(k+1) indicating a line for obtaining a desired torque in a subsequent control period. Namely, if the stator flux command value is on the torque line Te(k+1), a desired torque can be realized in the subsequent control period.

Based on the torque line Te(k+1), the DB-DTFC calculation module 15 determines a stator flux command value in view of the amount of loss in the voltage-second coordinate system. The term "voltage-second" means the product of voltage and time (seconds), which represents flux. Since the amount of operation in DB-DTFC is flux, the output voltage of the inverter 5 is calculated by handling the flux as the product of the control period, represented by "voltage-second," and the output voltage of the inverter. During a braking operation, the DB-DTFC calculation module 15 determines a vector quantity of the volt-time (flux) so as to maximize the amount of loss. Based on the determined vector quantity of the volt-time (flux), the DB-DTFC calculation module 15 calculates a stator dq-axes voltage command value Vqds* expressed by the dq-axes coordinate system, using an command value for the output voltage of the inverter 5. The DB-DTFC calculation module 15 outputs the calculated stator dq-axes voltage command value Vqds* to the coordinate conversion module 16. The DB-DTFC calculation module 15 also supplies the current/flux estimation module 18 with the stator dq-axes voltage command value Vqds* as the stator dq-axes voltage Vqds(k) used by the current/flux estimation module 18.

The coordinate conversion module 16 converts the stator dq-axes voltage command value Vqds* into three-phase stator voltage command values Vas*, Vbs* and Vcs*, and outputs the converted three-phase stator voltage command values Vas*, Vbs* and Vcs* to the inverter 5. Based on the input three-phase stator voltage command values Vas*, Vbs* and Vcs*, the inverter 5 outputs three-phase AC voltages.

The coordinate conversion module 17 receives three-phase stator currents Ias, Ibs and Ics detected by the current detectors 7a, 7b and 7c and output from the inverter 5. Alternatively, the coordinate conversion module 17 may receive currents of two phases, and calculate the current of the remaining one phase. The coordinate conversion module 17 converts the three-phase stator currents Ias, Ibs and Ics into a stator dq-axes current iqds(k) used in the calculation by the current/flux estimation module 18.

The current/flux estimation module 18 receives the rotor angle estimate value θr0(k) from the speed/phase estimation module 11, the stator dq-axes voltage command value Vqds*(k) from the coordinate conversion module 17, and the stator dq-axes current iqds(k) from the coordinate conversion module 17. Based on the rotor angle estimate value θr0(k), the stator dq-axes voltage command value Vqds*(k) and the stator dq-axes current iqds(k), the current/flux estimation module 18 calculates the stator dq-axes flux estimate value λqds0(k) and the rotor dq-axes flux estimate value λqdr0(k). The current/flux estimation module 18 supplies the DB-DTFC calculation module 15 with the calculated two flux estimate values λqds0(k) and λqdr0(k).

The control law of DB-DTFC will now be described.

Figure 2:
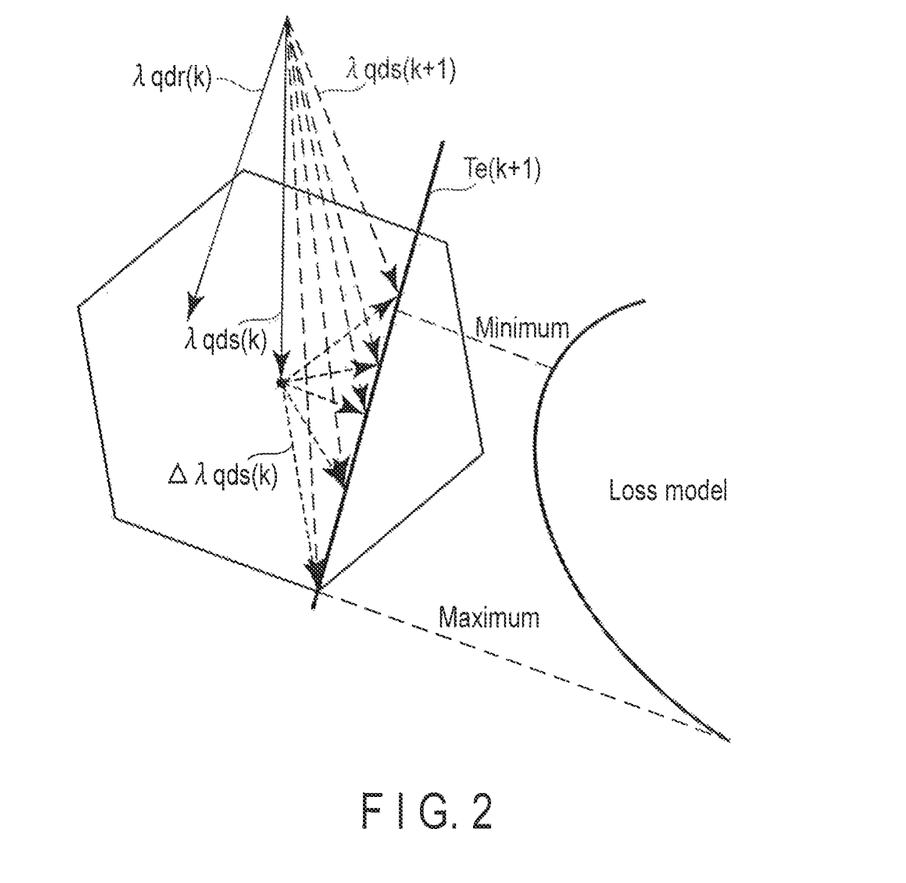
FIG. 2 is a conceptual diagram according to the embodiment showing, in a single voltage-second coordinate system, the torque line derived from a physical model of an induction motor, the range of a stator flux that can be output in a subsequent control period, and a loss model.

FIG. 2 is a conceptual diagram according to the embodiment showing, in a single voltage-second coordinate system, the torque line Te(k+1) derived from the physical model of the induction motor 6, the range of a stator flux that can be output in a subsequent control period, and the loss model.

The control variables used for DB-DTFC are the torque command value (air-gap torque) Tem*(k) and the stator flux vector command value λqds*(k).

It is supposed that the upper and lower arms of the power conversion circuit of the inverter 5 are each formed of one switching element. In this case, the power conversion circuit is formed of six switching elements. The six switching elements have eight switching patterns in total. If these eight switching patterns are used, the voltage vectors that can be output from the inverter 5 form a hexagon as shown in FIG. 2. Accordingly, the range of the voltages that can be output from the inverter 5 falls within the hexagon.

The torque line Te(k+1) is a line indicating a stator flux vector λqds(k+1) for obtaining a desired torque in a subsequent control period. The torque line Te(k+1) is determined by the torque command value Tem*(k), the stator flux vector λqds(k) and the rotor flux vector λqdr(k).

The loss is determined from the distance between the stator flux vector λqds(k+1) and a loss model preset based on the circuit of the induction motor 6. Accordingly, by selecting the stator flux vector λqds(k+1) from the vectors on the torque line Te(k+1) in accordance with the loss model, the loss can be varied while a desired torque is being output.

Figure 3:
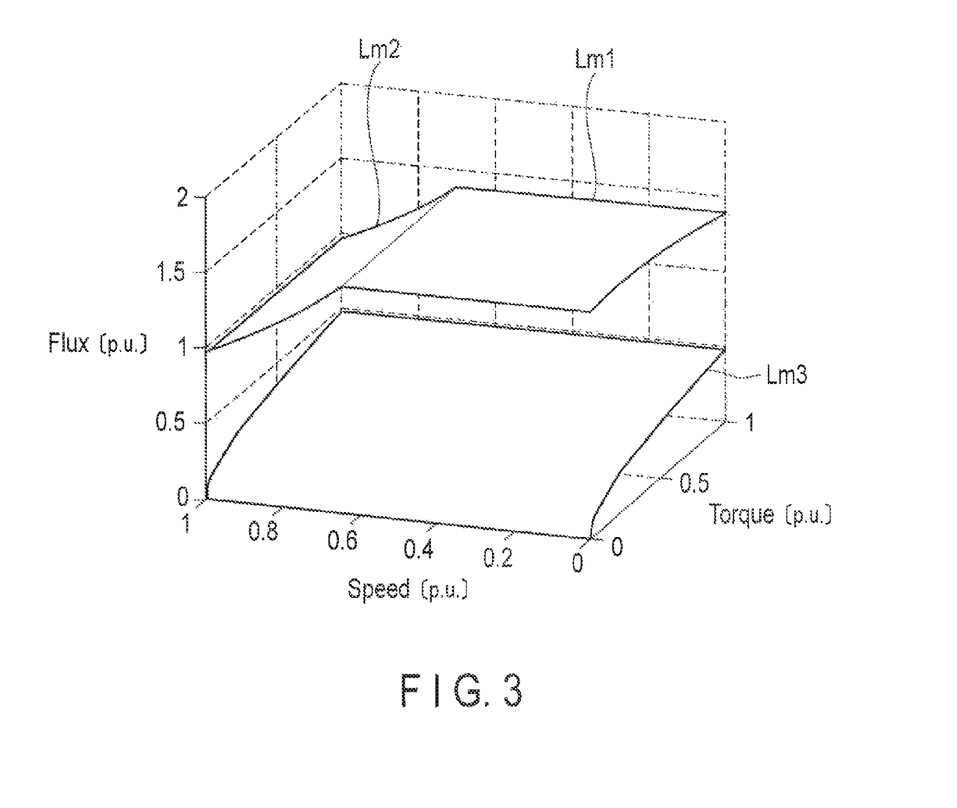
FIG. 3 is a graph according to the embodiment analytically showing the magnitude range of the stator flux of the induction motor.

FIG. 3 is a graph according to the embodiment analytically showing the range of the stator flux magnitude of the induction motor 6. The vertical axis indicates the magnitude of the stator flux, the horizontal axis indicates the speed of the rotor, and the depth indicates the magnitude of the torque.

In DB-DTFC, it is necessary to control the magnitude of the stator flux within the range shown in FIG. 3. The magnitude range of the stator flux is limited by voltage, current and loading condition. By the loading condition, the lower limit Lm3 of the magnitude of the stator flux is determined in accordance with the torque. When the speed of the rotor is relatively low, the upper limit Lm1 of the magnitude of the stator flux is limited by the rated current of the inverter 5 or the induction motor 6. When the speed of the rotor exceeds a predetermined value (about 0.7 p.u. in FIG. 3), the upper limit Lm2 of the magnitude of the stator flux is limited in accordance with the induced voltage.

Further, by permitting the DC voltage of the inverter 5 to be varied within a certain range (e.g., 5%), the torque of the brake (this is a negative torque if the torque assumed during power running is defined to be positive) can be strengthened, compared to the case where the DC voltage of the inverter 5 is maintained constant.

Figure 4:
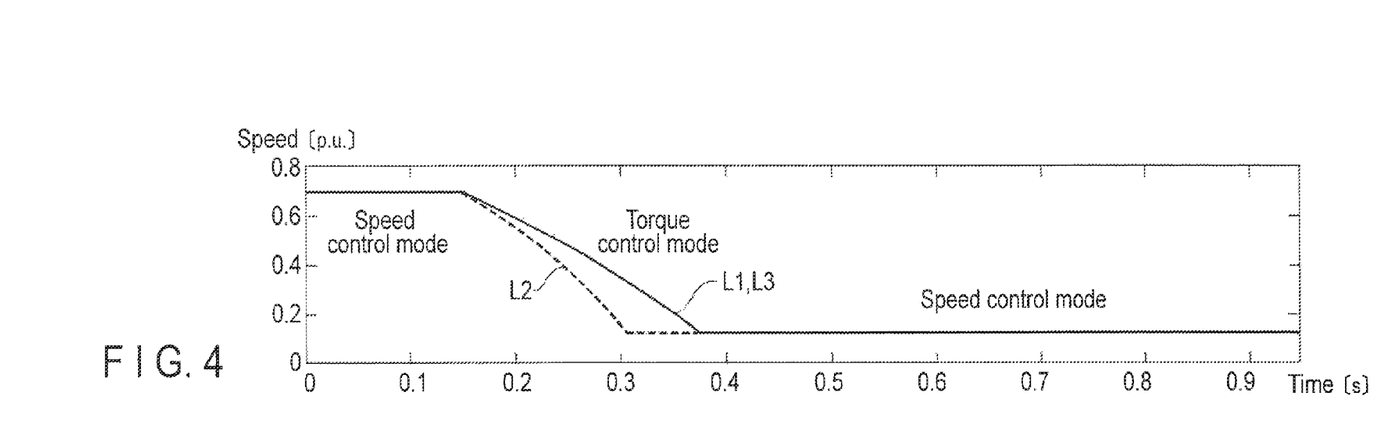
FIG. 4 is a graph showing plots of speed against time obtained when braking control is performed by the controller according to the embodiment.
Figure 5:
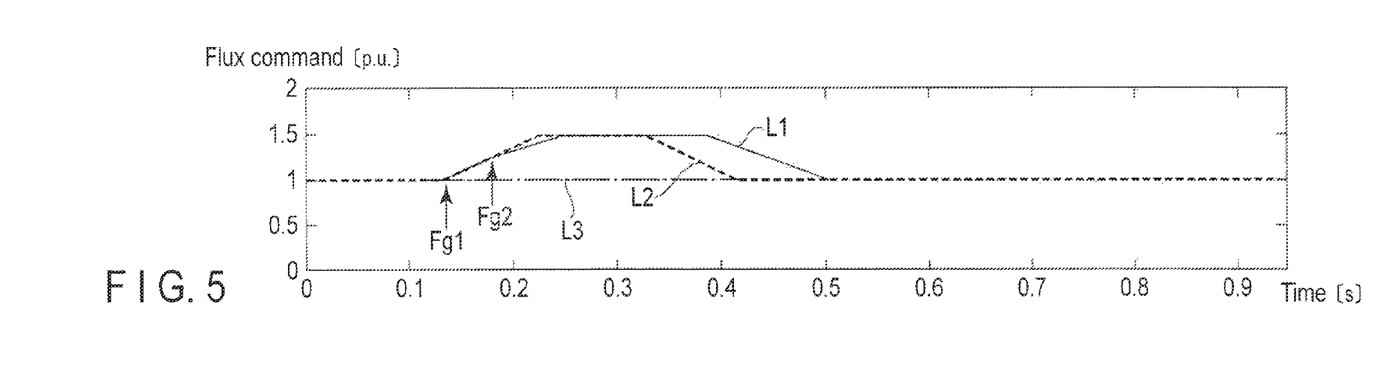
FIG. 5 is a graph showing plots of flux command values against time obtained when braking control is performed by a controller according to the embodiment.
Figure 6:
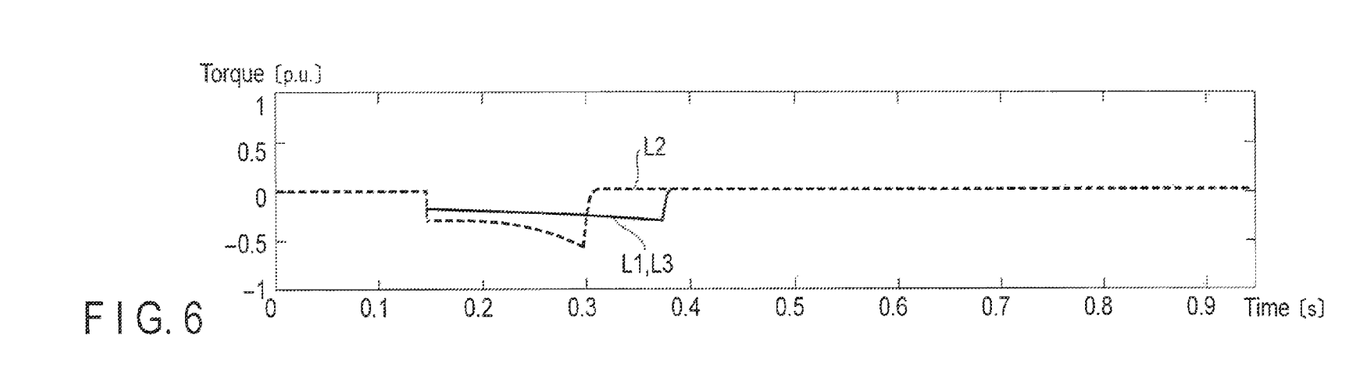
FIG. 6 is a graph showing plots of torque against time obtained when braking control is performed by the controller according to the embodiment.
Figure 7:
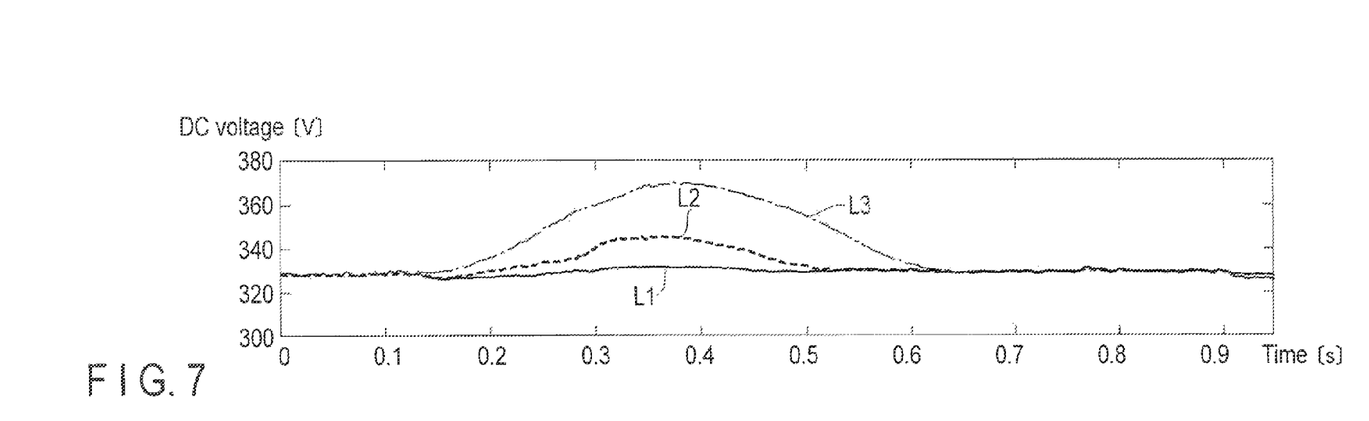
FIG. 7 is a graph showing plots of DC voltage against time obtained when braking control is performed by the controller according to the embodiment.

Referring now to FIGS. 4 to 7, control by the controller 1 during braking will be described. FIGS. 4 to 7 show plots L1, L2 and L3 of parameters during braking. The plots L1 show the case where variation (increase) in the voltage of the capacitor 4 is not allowed. The plots L2 show the case where variation (increase) in the voltage of the capacitor 4 is allowed within a range of 5%. Further, the plots L3 show the case where the magnitude of the flux is maintained constant (at 1 p.u.). This case is a comparative example to be compared with the embodiment. FIG. 4 shows the plots L1 to L3 of speed values. FIG. 5 shows the plots L1 to L3 of flux command values. FIG. 6 shows the plots L1 to L3 of torque values. FIG. 7 shows the plots L1 to L3 of DC voltages. The plots L1 to L3 of the respective parameters shown in FIGS. 5 to 7 indicate variations that have occurred in accordance with the variation in speed shown in FIG. 4 and represented by the plots L1 to L3.

When the brake preparation flag Fg1 has been set to execute braking, the controller 1 increase the magnitude of the stator flux with the speed control continued, in accordance with a preset stator flux command value.

When the magnitude of the stator flux has reached the value that causes a maximum loss, the brake start flag Fg2 is set and the torque control is executed so as to perform maximum braking within the upper limit range of the DC linkage voltage in accordance with a preset torque command value. At this time, the flux and the torque are varied in accordance with the speed of the induction motor 6. As a result, braking is realized to reduce the speed. When the speed has reduced to a target value, control is returned to speed control to reduce the magnitude of the flux to a rated value (1 p.u.).

The embodiment can also provide the following advantages:

Even if no new hardware is added, the loss of the induction motor 6 can be increased during braking to enable to consume regeneration energy in the induction motor 6 by applying the software to perform the DB-DTFC.

Thus, the regeneration energy can be consumed within the induction motor 6 and the induction motor 6 can be decelerated in a shorter time.

Since the volt-time (i.e., flux) output from the inverter 5 is controlled and then supplied to the induction motor 6, the flux can be directly controlled, whereby the induction motor 6 can be operated to maximize the loss.

By controlling the stator flux of the induction motor 6, the loss effective to consume regeneration energy can be quickly generated. Further, since in the embodiment, the flux can be directly controlled, highly responsive braking can be realized without undesirable torque ripple and without the influence of the first-order lag transfer function upon the control.

It is to be noted that the present invention is not restricted to the foregoing embodiment, and constituent elements can be modified and changed into shapes without departing from the scope of the invention at an embodying stage. Additionally, various inventions can be formed by appropriately combining a plurality of constituent elements disclosed in the foregoing embodiment. For example, several constituent elements may be eliminated from all constituent elements disclosed in the embodiment.

What is claimed is:

1. A controller for a power converter configured to drive a motor, the controller comprising:
   a current detector configured to detect a current output from the power converter;
   a flux vector estimation module configured to estimate a flux vector of the motor based on the current detected by the current detector;
   a torque line calculation module configured to calculate a torque line in a physical model resulting from mathemating a circuit equivalent to the motor based on the flux vector estimated by the flux vector estimation module, the torque line indicating a line for obtaining a desired torque in a subsequent control period;
   a stator flux command value calculation module configured to calculate a stator flux command value in accordance with a loss;
   a voltage command value calculation module configured to calculate a voltage command value based on the torque line calculated by the torque line calculation module and the stator flux command value calculated by the stator flux command value calculation module; and
   an output voltage controller configured to control an output voltage of the power converter based on the voltage command value calculated by the voltage command value calculation module.

2. The controller of claim 1, wherein the voltage command value calculation module calculates, in every control period, the voltage command value for the stator flux to reach a target value derived from the physical model.

3. The controller of claim 1, wherein when a brake is put on the motor, the stator flux command value calculation module maximizes the loss.

4. The controller of claim 3, wherein when the motor is in a power running operation, the stator flux command value calculation module minimizes the loss.

5. A motor drive system comprising:
   a motor;
   a power converter configured to drive the motor; and
   a controller configured to control the power converter, wherein
   the controller comprises:
   a current detector configured to detect a current output from the power converter;
   a flux vector estimation module configured to estimate a flux vector of the motor based on the current detected by the current detector;
   a torque line calculation module configured to calculate a torque line in a physical model resulting from mathemating a circuit equivalent to the motor based on the flux vector estimated by the flux vector estimation module, the torque line indicating a line for obtaining a desired torque in a subsequent control period;

a stator flux command value calculation module configured to calculate a stator flux command value in accordance with a loss;

a voltage command value calculation module configured to calculate a voltage command value based on the torque line calculated by the torque line calculation module and the stator flux command value calculated by the stator flux command value calculation module; and an output voltage controller configured to control an output voltage of the power converter based on the voltage command value calculated by the voltage command value calculation module.

6. The motor drive system of claim 5, wherein the voltage command value calculation module calculates, in every control period, the voltage command value for the stator flux to reach a target value derived from the physical model.

7. The motor drive system of claim 5, wherein when a brake is put on the motor, the stator flux command value calculation module maximizes the loss.

8. The motor drive system of claim 7, wherein when the motor is in a power running operation, the stator flux command value calculation module minimizes the loss.

9. A control method for a power converter configured to drive a motor, the control method comprising:
   detecting a current output from the power converter;
   estimating a flux vector of the motor based on the detected current;
   calculating a torque line in a physical model resulting from mathemating a circuit equivalent to the motor based on the estimated flux vector, the torque line indicating a line for obtaining a desired torque in a subsequent control period;
   calculating a stator flux command value in accordance with a loss;
   calculating a voltage command value based on the calculated torque line and the calculated stator flux command value; and
   controlling an output voltage of the power converter based on the calculated voltage command value.

10. The control method of claim 9, wherein in every control period, the voltage command value is calculated for the stator flux to reach a target value derived from the physical model.

11. The control method of claim 9, wherein when a brake is put on the motor, the loss is maximized.

12. The control method of claim 11, wherein when the motor is in a power running operation, the loss is minimized.

* * * * *